(12) United States Patent
Felt

(10) Patent No.: US 9,125,009 B2
(45) Date of Patent: Sep. 1, 2015

(54) DETERMINATION AND REPRESENTATION OF CALL APPROPRIATENESS

(75) Inventor: Michelle Felt, Randolph, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 468 days.

(21) Appl. No.: 13/282,891

(22) Filed: Oct. 27, 2011

(65) Prior Publication Data

US 2013/0109361 A1   May 2, 2013

(51) Int. Cl.
*H04W 4/02* (2009.01)
*H04W 4/16* (2009.01)
*H04W 4/20* (2009.01)

(52) U.S. Cl.
CPC . *H04W 4/02* (2013.01); *H04W 4/16* (2013.01); *H04W 4/20* (2013.01)

(58) Field of Classification Search
CPC ..... H04W 4/02; H04W 4/025; H04W 64/003; H04N 21/258; H04L 51/32; H04M 15/8351
USPC ............... 455/414.1, 456.1; 379/188, 201.07, 379/201.08, 207.03
See application file for complete search history.

(56) References Cited

U.S. PATENT DOCUMENTS

| | | | |
|---|---|---|---|
| 5,216,709 A * | 6/1993 | Wen et al. ...................... 379/354 |
| 5,818,920 A * | 10/1998 | Rignell et al. ........... 379/211.02 |
| 6,075,992 A * | 6/2000 | Moon et al. ................... 455/455 |
| 6,751,483 B1 * | 6/2004 | Oh ................................. 455/566 |
| 7,474,744 B2 * | 1/2009 | Janssen ..................... 379/201.07 |
| 8,358,764 B1 * | 1/2013 | Correa et al. ............ 379/210.01 |
| 2002/0168987 A1 * | 11/2002 | Wang et al. ................... 455/456 |
| 2002/0168997 A1 * | 11/2002 | Katagishi et al. ............. 455/550 |
| 2006/0223518 A1 * | 10/2006 | Haney ........................... 455/420 |
| 2006/0286970 A1 * | 12/2006 | Otobe et al. .................. 455/415 |
| 2007/0070186 A1 * | 3/2007 | Fujimori et al. ........... 348/14.03 |
| 2007/0104217 A1 * | 5/2007 | Gilboa-Freedman et al. ............................. 370/465 |
| 2008/0153474 A1 * | 6/2008 | Scott ............................. 455/418 |
| 2009/0016509 A1 * | 1/2009 | Shah ........................ 379/142.11 |
| 2010/0180212 A1 * | 7/2010 | Gingras et al. ................ 715/751 |
| 2011/0151415 A1 * | 6/2011 | Darling ......................... 434/149 |

* cited by examiner

*Primary Examiner* — Anthony Addy
*Assistant Examiner* — Edd Rianne Plata

(57) ABSTRACT

A method, performed by a mobile communication device, may include receiving a request to call a contact; determining a location associated with the contact; determining a local time associated with the contact based on the determined location; and determining an appropriateness level for calling the contact, based on the determined local time. The method may further include generating a graphical representation that relates a local time associated with the mobile communication device, the local time associated with the contact, and an indication of the determined appropriateness level for calling the contact.

19 Claims, 16 Drawing Sheets

440 and/or 520 ⟶

```
┌─────────────────────────────┐
│      USER ID                │
│        610                  │
├─────────────────────────────┤
│    USER LOCATION            │
│        620                  │
├─────────────────────────────┤
│   USER LOCAL TIME           │
│        630                  │⎫
├─────────────────────────────┤⎬ 600   • • •
│  USER TIME PREFERENCES      │⎭
│        640                  │
├─────────────────────────────┤
│ ASSOCIATED USER ACCOUNTS    │
│        650                  │
├─────────────────────────────┤
│     USER STATUS             │
│        660                  │
├─────────────────────────────┤
│  APPROPRIATENESS LEVEL      │
│        670                  │
└─────────────────────────────┘
```

| DEFAULT TABLE 680 |
|---|
| COUNTRY TABLES 682 |
| CALL TYPE TABLES 684 |
| STATUS TABLE 686 |

DETERMINATION AND REPRESENTATION OF CALL APPROPRIATENESS

BACKGROUND INFORMATION

A user of a mobile communication device may use the mobile communication device to place or receive telephone calls. The user may have contacts in other countries and may be able to use the mobile communication device for international calls and/or for calls to users located in another time zone. The user may find it cumbersome to keep track of appropriate times to call another user located in a different country and/or different time zone.

BRIEF DESCRIPTION OF THE DRAWINGS

FIG. 6A is a diagram of exemplary fields of a user record according to an implementation described herein;

FIG. 6B is a diagram of exemplary fields of an appropriateness level memory according to an implementation described herein;

DETAILED DESCRIPTION OF PREFERRED EMBODIMENTS

Figure 1:
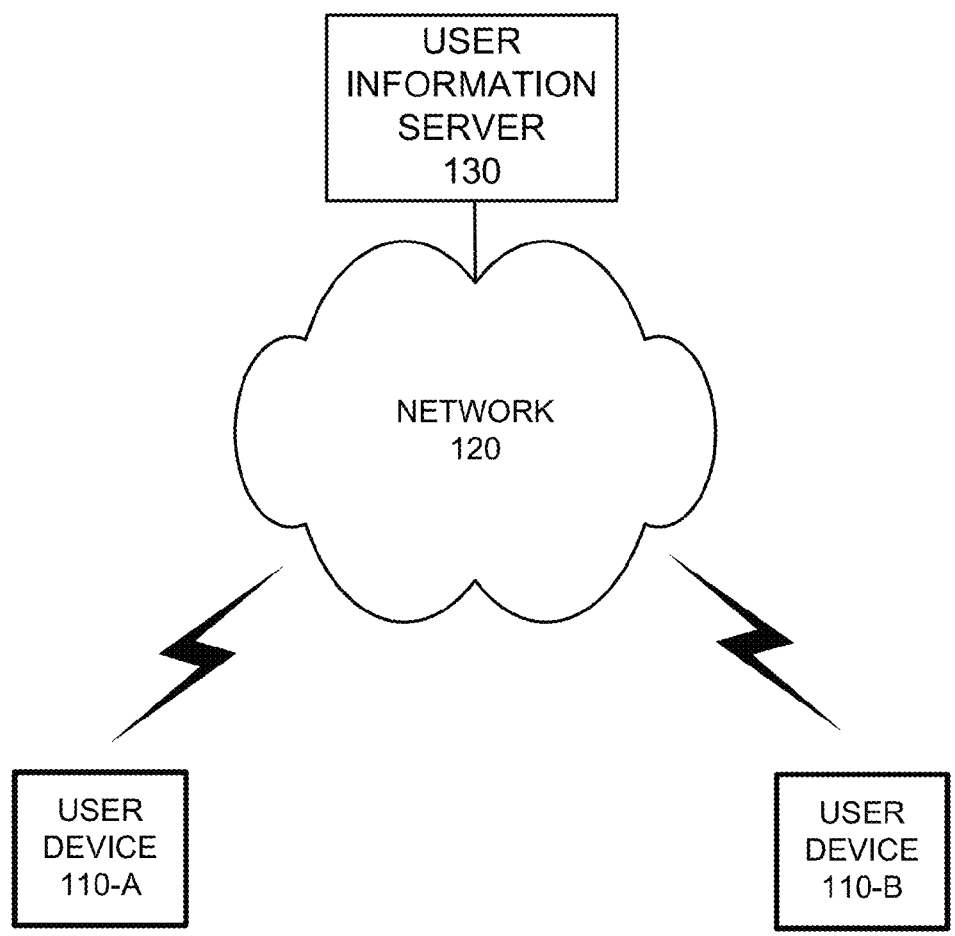
FIG. 1 is a diagram illustrating an exemplary environment according to an implementation described herein.

The following detailed description refers to the accompanying drawings. The same reference numbers in different drawings identify the same or similar elements.

An implementation described herein may relate to determination and representation of call appropriateness. When a user selects a contact to call, the contact's location is determined and the local time associated with the contact is determined based on the contact's location. Based on the contact's local time, an appropriateness level is determined for calling the contact. For example, if the contact's local time is within a first range of hours (e.g., day and evening hours), the appropriateness level may be determined to be high, and if the contact's local time is within a second range of hours (e.g., night hours), the appropriateness level may be determined to be low. As another example, the appropriateness level may be set to a first level (e.g., "inappropriate") if the contact's local time is within a first range of time (e.g., night hours), may be set to a second level (e.g., "somewhat appropriate") if the contact's local time is within a second range of time (e.g., early morning and evening hours), and may be set to a third level (e.g., "appropriate") if the contact's local time is within a third range of time (e.g., day hours). As another example, the appropriateness level may be determined based on additional factors, such as days of week, holidays, type of call (e.g., business or personal), a status associated with the contact, a country associated with the contact, and/or another factor associated with the contact.

Furthermore, a contact may designate a particular range of time as being associated with a particular appropriateness level and the determination of the appropriateness level may be based on the designation made by the contact. Moreover, a status associated with the contact may be determined and the appropriateness level may be based on the determined status associated with the contact.

A graphical representation of the user's time, the contact's local time, and the determined appropriateness level may be generated. In one implementation, the graphical representation may include a time zone wheel that relates the user's time to the contact's time, aligned concentrically on a clock. The appropriateness level of calling the contact may be represented by a particular color, shading, pattern, graphical indicator, text, or an audible message associated with the part of the clock that displays the contact's time. The time zone wheel may provide a graphical representation that may make it easy for the user to see the relationship between the user's time and the contact's time, as well as the appropriateness of calling the contact at the current time associated with the user. Furthermore, other information associated with the contact may be displayed on the time zone wheel, such as, for example, local weather associated with the contact, information identifying a country associated with the contact's location, a status associated with the contact, etc.

The time zone wheel may also display multiple contacts. For example, the user may select an additional contact and the local time and appropriateness level associated with the additional contact may be displayed on the time zone wheel as an additional wheel around the previously displayed time zone wheel. Displaying additional contacts on the time zone wheel may enable the user to select a particular contact from multiple contacts to call based on the displayed appropriateness levels. Furthermore, displaying additional contact on the time zone wheel may enable the user to select an appropriate time to set up a conference call that includes multiple contacts.

The time zone wheel may be used to schedule a call between the user and one or more contacts. For example, the user may select a time range and may select one or more contacts with which to schedule a conference call. A time range associated with a particular appropriateness level may be determined for each selected contact and displayed on a time zone wheel in relation to the user's selected time range. A time range within the user's selected time range may be determined and displayed, wherein the time range include times associated with appropriate times for each of the selected contacts (or for as many of the selected contacts as possible). In another implementation, a multi-slider graphical representation may be used to schedule a call between the user and one or more contacts.

An appropriateness level for calling a contact may be displayed in connection with information associated with the contact, such as a contact listing. For example, when a user views a list of contacts stored on the user's mobile communication device, the appropriateness level associated with a particular contact may be represented as a color and/or shading of a background associated with the particular contact listing. Furthermore, other information associated with the contact may be displayed in connection with the contact listing, such as, for example, local weather associated with the contact, information identifying a country associated with the contact's location, a status associated with the contact, etc.

Information associated with one or more of the user's contacts may be displayed on a time zone map. For example, the information may include information identifying a contact, a local time associated with the contact, an appropriateness level associated with the contact, and/or a status associated with the contact.

FIG. 1 is a diagram of an exemplary environment 100 in which the systems and/or methods described herein may be implemented. As shown in FIG. 1, environment 100 may include a user device 110-A, a user device 110-B, a network 120, and a user information server 130. While FIG. 1 depicts two user devices 110 (referred to herein collectively as "user devices 110" and individually as "user device 110") for illustrative purposes, environment 100 may include a larger number of user devices 110.

User device 110 may include a mobile communication device, such as a mobile phone, a smart phone, a tablet computer, a laptop, a personal digital assistant (PDA), a video phone, a voice over Internet Protocol (VoIP) phone, a television phone, and/or another type of portable communication device. A user of user device 110-A may select to call a user of user device 110-B over network 120. User device 110-B may be located in a time zone different from the time zone associated with user device 110-A. User device 110-A may determine an appropriateness level for calling user device 110-B and may display a graphical representation, such as a time zone wheel, of the local time associated with user device 110-A, the local time associated with user device 110-B, and the appropriateness level for calling user device 110-B.

Network 120 may enable user device 110-A, user device 110-B, and user information server 130 to communicate with each other. Network 120 may include one or more wired and/or wireless networks. For example, network 120 may include a cellular network, the Public Land Mobile Network (PLMN), a second generation (2G) network, a third generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a combination of the above networks, and/or another type of wireless network. Additionally, or alternatively, network 120 may include a local area network (LAN), a wide area network (WAN), a metropolitan area network (MAN), an ad hoc network, an intranet, the Internet, a fiber optic-based network (e.g., a fiber optic service network), a satellite network, a television network, and/or a combination of these or other types of networks.

In one implementation, user device 110-A may obtain information about user device 110-B, or about the user associated with user device 110-B, from user information server 130. User information server 130 may include one or more devices, such as computing devices, server devices, etc., that maintain information about users associated with user devices 110 and that may provide periodic updates about important contacts, associated with a particular user, to user device 110 associated with the particular user.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
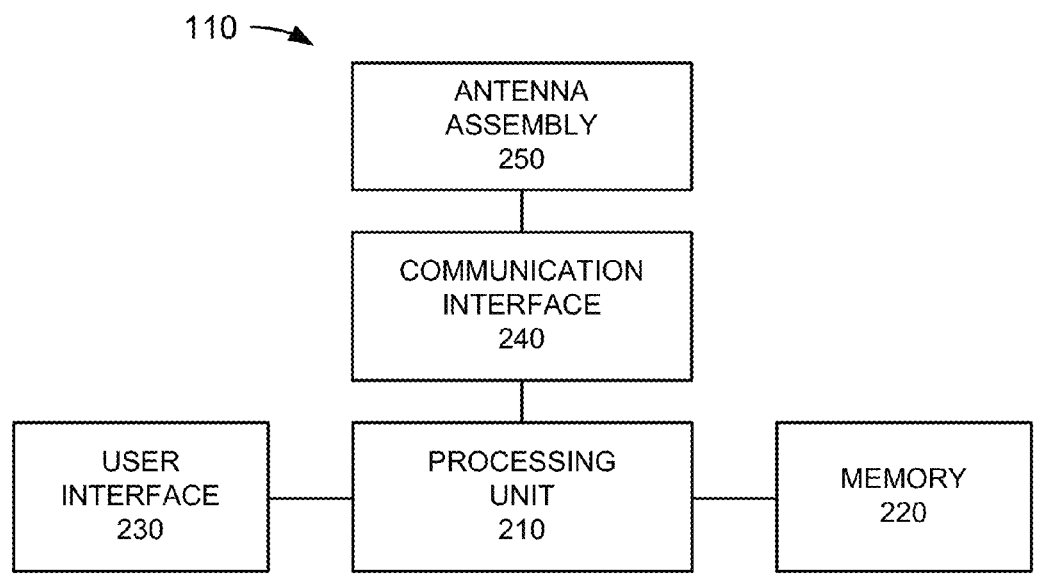
FIG. 2 is a diagram illustrating exemplary components associated with the user device of FIG. 1.

FIG. 2 is a diagram illustrating example components of user device 110 according to an implementation described herein. As shown in FIG. 2, user device 110 may include a processing unit 210, a memory 220, a user interface 230, a communication interface 240, and an antenna assembly 250.

Processing unit 210 may include one or more processors, microprocessors, application specific integrated circuits (ASICs), field programmable gate arrays (FPGAs), or other processing logic. Processing unit 210 may control operation of user device 110 and its components.

Memory 220 may include a random access memory (RAM) or another type of dynamic storage device, a read only memory (ROM) or another type of static storage device, a removable memory card, and/or another type of memory to store data and instructions that may be used by processing unit 210.

User interface 230 may include mechanisms for inputting information to user device 110 and/or for outputting information from user device 110. Examples of input and output mechanisms might include a speaker to receive electrical signals and output audio signals; a camera lens to receive image and/or video signals and output electrical signals; a microphone to receive audio signals and output electrical signals; buttons (e.g., a joystick, control buttons, a keyboard, or keys of a keypad) and/or a touchscreen to permit data and control commands to be input into user device 110; a display, such as an LCD, to output visual information; a vibrator to cause user device 110 to vibrate; and/or any other type of input or output device.

Communication interface 240 may include a transceiver that enables user device 110 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 240 may include a transmitter that converts baseband signals to radio frequency (RF) signals and/or a receiver that converts RF signals to baseband signals. Communication interface 240 may be coupled to antenna assembly 250 for transmitting and receiving RF signals.

Communication interface 240 may include a logical component that includes input and/or output ports, input and/or output systems, and/or other input and output components that facilitate the transmission of data to other devices. For example, communication interface 240 may include a network interface card (e.g., Ethernet card) for wired communications and/or a wireless network interface (e.g., a WiFi) card for wireless communications. Communication interface 240 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 250 may include one or more antennas to transmit and/or receive RF signals over the air. Antenna assembly 250 may, for example, receive RF signals from communication interface 240 and transmit the signals over the air and receive RF signals over the air and provide them to communication interface 240.

As described herein, user device 110 may perform certain operations in response to processing unit 210 executing software instructions contained in a computer-readable medium, such as memory 220. A computer-readable medium may be defined as a non-transitory memory device. A memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes that will be described later. Alternatively, hardwired circuitry may be used in place of, or in combination with, software instructions to implement processes described herein. Thus, implementations described herein are not limited to any specific combination of hardware circuitry and software.

Although FIG. 2 shows example components of user device 110, in other implementations, user device 110 may include fewer components, different components, differently arranged components, or additional components than depicted in FIG. 2. Additionally or alternatively, one or more components of user device 110 may perform the tasks described as being performed by one or more other components of user device 110.

Figure 3:
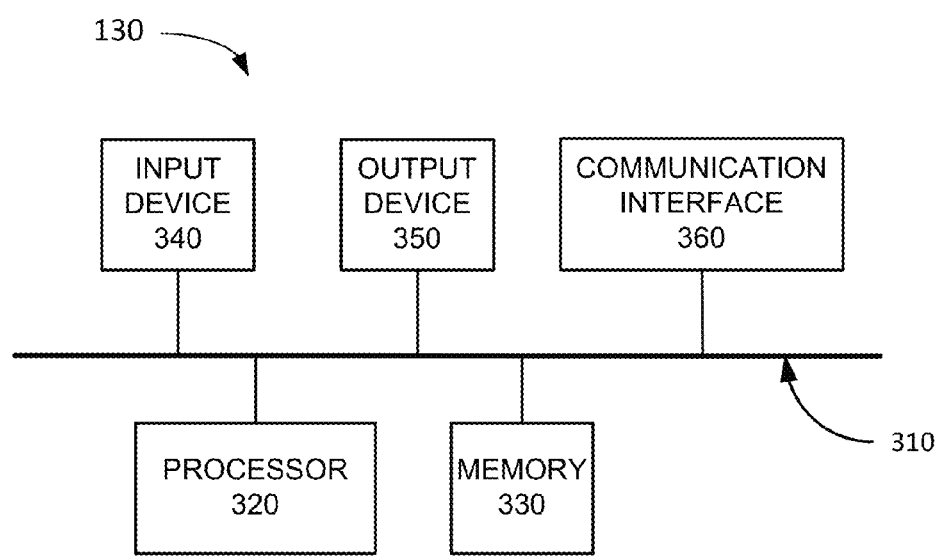
FIG. 3 is a diagram illustrating exemplary components associated with the user information server of FIG. 1.

FIG. 3 is a diagram illustrating example components of user information server 130 according to a first implementation described herein. As shown in FIG. 3, user information server 130 may include a bus 310, a processor 320, a memory 330, an input device 340, an output device 350, and a communication interface 360.

Bus 310 may include a path that permits communication among the components of user information server 130. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into user information server 130. Input device 340 may include, for example, a keyboard, a mouse, a pen, a microphone, a remote control, an audio capture device, an image and/or video capture device, a touch-screen display, and/or another type of input device. In some embodiments, user information server 130 may be managed remotely and may not include input device 340. In other words, user information server 130 may be "headless" and may not include a keyboard, for example.

Output device 350 may output information to an operator of user information server 130. Output device 350 may include a display, a printer, a speaker, and/or another type of output device. For example, user information server 130 may include a display, which may include a liquid-crystal display (LCD) for displaying content to the customer. In some embodiments, user information server 130 may be managed remotely and may not include output device 350. In other words, user information server 130 may be "headless" and may not include a display, for example.

Communication interface 360 may include a transceiver that enables user information server 130 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, user information server 130 may perform certain operations relating to management of information associated with users and to providing updated information about a user's contacts to the user. User information server 130 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of user information server 130, in other implementations, user information server 130 may include fewer components, different components, additional components, or differently arranged components than depicted in FIG. 3. Additionally or alternatively, one or more components of user information server 130 may perform one or more tasks described as being performed by one or more other components of user information server 130.

Figure 4:
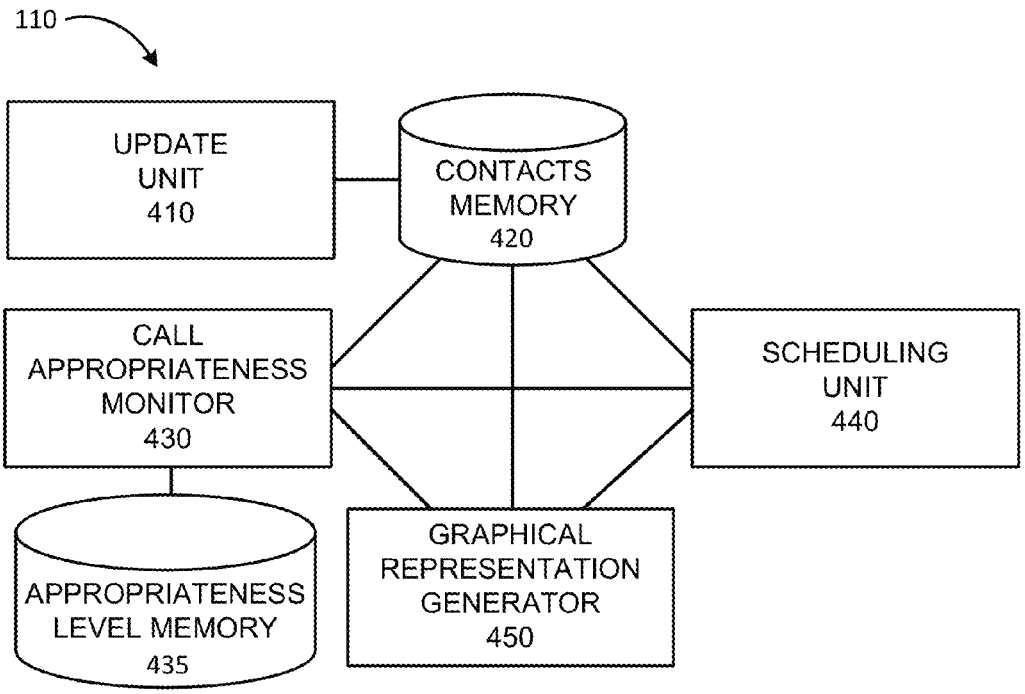
FIG. 4 is a diagram illustrating exemplary functional components of the user device of FIG. 1.

FIG. 4 is a diagram of exemplary functional components of user device 110. The functional components of user device 110 may be implemented, for example, via processing unit 210 executing instructions from memory 220. One or more of the functional components of FIG. 4 may be part of an add-on application that may be installed on, or downloaded onto, user device 110. In one example, the user may be provided with an option to download and install the add-on application on user device 110. In another example, the add-on application may be installed on user device 110 during, or prior to, activation of user device 110, without requiring user approval. As shown in FIG. 4, user device 110 may include an update unit 410, a contacts memory 420, a call appropriateness monitor 430, an appropriateness level memory 435, a scheduling unit 440, and a graphical representation monitor 450.

Update unit 410 may provide periodic updates about user device 110 to user information server 130. For example, update unit 410 may provide information about a location of user device 110. Furthermore, update unit 410 may provide information about appropriateness preferences selected by the user of user device 110 and/or about a status associated with the user of user device 110. Furthermore, update unit 410 may receive periodic updates about contacts associated with the user and may use the periodic updates to update information stored in contacts memory 420.

Contacts memory 420 may store information about contacts associated with the user of user device 110. Information that may be stored in contacts memory 420 is described in more detail below with reference to FIG. 6A.

Call appropriateness monitor 430 may monitor call appropriateness for contacts stored in contacts memory 420 or for numbers dialed by the user of user device 110. For example, call appropriateness monitor 430 may determine a local time associated with a contact and may determine an appropriateness level based on the local time and based on information stored in appropriateness level memory 435. Call appropriateness monitor 430 may take into consideration time preferences indicated by the contact in determining the appropriateness level. For example, the contact may have indicated that 9 AM to 5 PM are "appropriate," 7:30 AM to 9 AM and 5 PM to 8 PM as "somewhat appropriate" and 8 PM to 7:30 AM as "emergency only." Call appropriateness monitor 430 may take into account a day of the week and/or date in determining the appropriateness level. Furthermore, call appropriateness monitor 430 may take into account a status associated with the contact in determining the appropriateness level. In one example, the contact may indicate a status on user device 110 associated with the contact (e.g., a 'busy' status, an 'in meeting' status, etc.). In another example, a status associated with the contact may be determined based on information obtained from an account associated with the contact (e.g., based on a social media account associated with the contact).

Appropriateness level memory 435 may store information that relates a particular range of times to a particular appropriateness level. Information that may be stored in appropriateness level memory 435 is described in more detail below with reference to FIG. 6B.

Scheduling unit 440 may schedule a call with one or more contacts based on appropriateness levels associated with the one or more contacts. For example, the user may select one or more contacts with which to schedule a call. Scheduling unit 440 may identify a range of appropriate times for the selected contacts and may identify a range of times that is appropriate for each of the selected contacts (or for as many of the selected contacts as possible).

Graphical representation monitor 450 may generate a graphical representation relating the user's time, a contact's local time, and an appropriateness level for calling the contact. For example, graphical representation monitor 450 may generate a time zone wheel that displays the user's time and the contact's time aligned along a clock. As another example, graphical representation monitor 450 may generate a time wheel for one or more selected contacts, which indicates a range of times that is appropriate for each of the selected contacts, as determined by scheduling unit 440. As yet another example, graphical representation monitor 450 may generate a graphical representation of a contact listing that includes an indication of an appropriateness level for calling the contact and/or that includes an indication of a status associated with the contact. As yet another example, graphical representation monitor 450 may generate a map (e.g., a country map, a world map) that includes information about one or more contacts, such as, for example, a location of a contact, a local time associated with the contact, a status associated with the contact, and/or an appropriateness level associated with the contact.

Although FIG. 4 shows exemplary functional components of user device 110, in other implementations, user device 110 may include fewer functional components, different functional components, differently arranged functional components, or additional functional components than depicted in FIG. 4. Additionally or alternatively, one or more functional components of user device 110 may perform functions described as being performed by one or more other functional components of user device 110.

Figure 5:
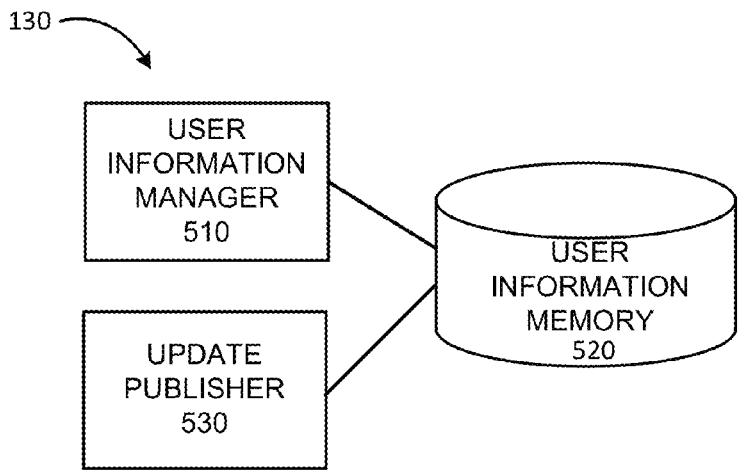
FIG. 5 is a diagram of exemplary functional components of the user information server of FIG. 1.

FIG. 5 is a diagram of exemplary functional components of user information server 130. The functional components of user information server 130 may be implemented, for example, via processor 320 executing instructions from memory 330. As shown in FIG. 5, user information server 130 may include a user information manager 510, a user information memory 520, and an update publisher 530.

User information manager 510 may manage information about users of user devices 110. For example, user information manager 510 may receive information about a particular user from user device 110, associated with the user, and may store the information in user information memory 520. Information about the user that may be received by user information manager 510 may include, for example, information about a location associated with the user, information about time preferences associated with the user, information about an account associated with the user, information about a status associated with the user, information about an appropriateness level associated with the user, and/or any other information about the user that may be stored in user information memory 520. Additionally or alternatively, user information manager 510 may receive information about the user from another device, such as, for example, a network node that maintains location information associated with the user.

User information memory 520 may store information about users of user devices 110. Information that may be stored in user information memory 520 is described in more detail below with reference to FIG. 6A.

Update publisher 530 may publish information about a user's contacts to the user at particular intervals. For example, update publisher 530 may determine a set of important contacts associated with the user and may publish information about the set of important contacts to the user at particular intervals. For example, update publisher 530 may provide an update about a location associated with an important contact, an update about time preferences associated with the important contact, an update about an account associated with the important contact, an update about a status associated with the important contact, an update about an appropriateness level associated with the important contact, and/or any other update about the important contact.

Although FIG. 5 shows exemplary functional components of user information server 130, in other implementations, user information server 130 may include fewer functional components, different functional components, differently arranged functional components, or additional functional components than depicted in FIG. 5. Additionally or alternatively, one or more functional components of user information server 130 may perform functions described as being performed by one or more other functional components of user information server 130.

FIG. 6A is a diagram of exemplary information that may be stored in contacts memory 420 and/or user information memory 520. As shown in FIG. 6A, contacts memory 420 and/or user information memory 520 may include one or more user records 600 (referred to herein collectively as "user records 600" and individually as "user record 600"). User record 600 may include a user identification (ID) field 610, a user location field 620, a user local time field 630, a user time preferences field 640, an associated user accounts field 650, a user status field 660, and an appropriateness level field 670.

User ID field 610 may store information that uniquely identifies a particular user. For example, user ID field 610 may store a mobile communication device identifier associated with the user, such as, for example, a Mobile Subscriber Integrated Services Digital Network number (MSISDN), an International Mobile Subscriber Identity (IMSI) number, a mobile identification number (MIN), an International Mobile Equipment Identifier (IMEI), an Integrated Circuit Card Identifier (ICCI), and/or any other mobile communication device identifier.

User location field 620 may store information about a location associated with the particular user. The location information may be stored in any format, such as, for example, Global Positioning System (GPS) coordinates, coordinates in a hierarchical grid scheme, a street address, etc. Additionally or alternatively, the location information may include less specific information, such as, for example, information identifying a country and/or a time zone. The location information may be obtained, for example, from user device 110 associated with the user (e.g., if user device 110 includes a GPS receiver). As another example, the location information may be obtained from a network node associated with a service provider, which may determine the location of user device 110 through a multilateration process, by identifying a particular base state communicating with user device 110, and/or by another network-based method of determining the location of user device 110. Furthermore, user location field 620 may include information identifying when the location information was last updated and/or whether the location information is to be considered outdated.

User local time field 630 may store information about a local time associated with the particular user. The local time may be determined by identifying the time zone associated with the location of the particular user and by determining a current time associated with the identified time zone.

User time preferences field 640 may store information about time preferences associated with the particular user. For example, a user may indicate that for business calls, times from 9 AM to 5 PM are appropriate and all other times are inappropriate and that for personal calls, times from 7:30 AM to 9 AM and from 5 PM to 9 PM are appropriate, and all other times are inappropriate. As another example, the user may be in church every Sunday from 10 AM to 12 PM and may indicate that range of times as inappropriate. The user may save the time preferences using, for example, update unit 410, and update unit 410 may provide the saved time preferences to user information server 130.

Associated user accounts field 650 may store information about one or more accounts associated with the particular user, such as, for example, an account associated with a social media website (e.g., Facebook, MySpace, LinkedIn, Google+, etc.). In one implementation, the particular user may provide information about the associated accounts to user information server 130 via update unit 410. In another implementation, information about the associated accounts may be obtained using another technique, such as, for example, by identifying web documents that are associated with the particular user. The associated accounts may be used to determine a status associated with the user. For example, a user may post an update on a Facebook account about what the user is currently doing. The update may be used to determine a status associated with the user.

User status field 660 may store information about a status associated with the particular user. For example, the status may be based on information received from user device 110. For example, the user may set user device 110 to an airplane mode while the user is on a flight. As another example, the user may select an indication on user device 110 to indicate that the user is in a meeting. As yet another example, an account associated with the user (e.g., based on associated user accounts field 650) may be used to determine a status associated with the user.

Appropriateness level field 670 may store information about a current appropriateness level associated with the particular user. In one example, the appropriateness level may be based on the local time associated with the user. In another example, the appropriateness level may be based on additional factors, such as, for example, time preferences associated with the particular user, a status associated with the particular user, etc.

Although FIG. 6A shows exemplary fields that may be included in user record 600, in other implementations, user record 600 may include fewer fields, different fields, differently arranged fields, and/or additional fields than depicted in FIG. 6A.

FIG. 6B is a diagram of exemplary fields or tables of an appropriateness level memory 435 according to an implementation described herein. As shown in FIG. 6B, appropriateness level memory 435 may include a default table 680, one or more country tables 682, one or more call type tables 684, and a status table 686.

Default table 680 may store a default table that relates a particular local time to a particular appropriateness level. An example default table 680 may include the following entries:

| Time Range | Appropriateness Level | Description |
|---|---|---|
| 7 AM to 9 AM | 1 | "appropriate with caution" |
| 9 AM to 5 PM | 2 | "appropriate" |
| 5 PM to 8 PM | 1 | "appropriate with caution" |
| 8 PM to 7 AM | 0 | "inappropriate" |

Default table 680 may be used to identify an appropriateness level when no other factors are being considered or when no other table is found to be appropriate for determining the appropriateness level. In this example, the value 2 may correspond to the highest appropriateness level.

Country tables 682 may store one or more tables specific to particular countries. For example, a range of business hours for a first country may be different than a range of business hours for a second country. Furthermore, a particular country table may associate a particular appropriateness level with a particular day of the week or a particular date (e.g., corresponding to a holiday in a particular country).

Call type tables 684 may include one or more tables for different types of calls. For example, a user may designate a call as a business call or as a personal call and call type tables 684 may include a first table for business calls and a second table for personal calls.

Status table 686 may include a table that associates particular status indications with particular appropriateness levels. A status indication may include a particular status identifier or a particular term or phrase associated with a contact. An example status table 686 may include the following entries:

| Status | Appropriateness Level | Description |
| --- | --- | --- |
| airplane mode | 0 | "unavailable" |
| meeting mode | 0 | "inappropriate" |
| "eat," "dinner," "lunch" | 1 | "appropriate with caution" |
| "available," "bored," "stuck in traffic," "looking for something to do" | 2 | "appropriate" |

In the above exemplary status table, airplane mode and meeting mode may be selectable modes available on user device 110, while the other entries may correspond to terms or phrases that may be identified in an update or post associated with a contact.

Although FIG. 6B shows exemplary fields that may be included in appropriateness level memory 435, in other implementations, appropriateness level memory 435 may include fewer fields, different fields, differently arranged fields, and/or additional fields than depicted in FIG. 6B.

Figure 7:
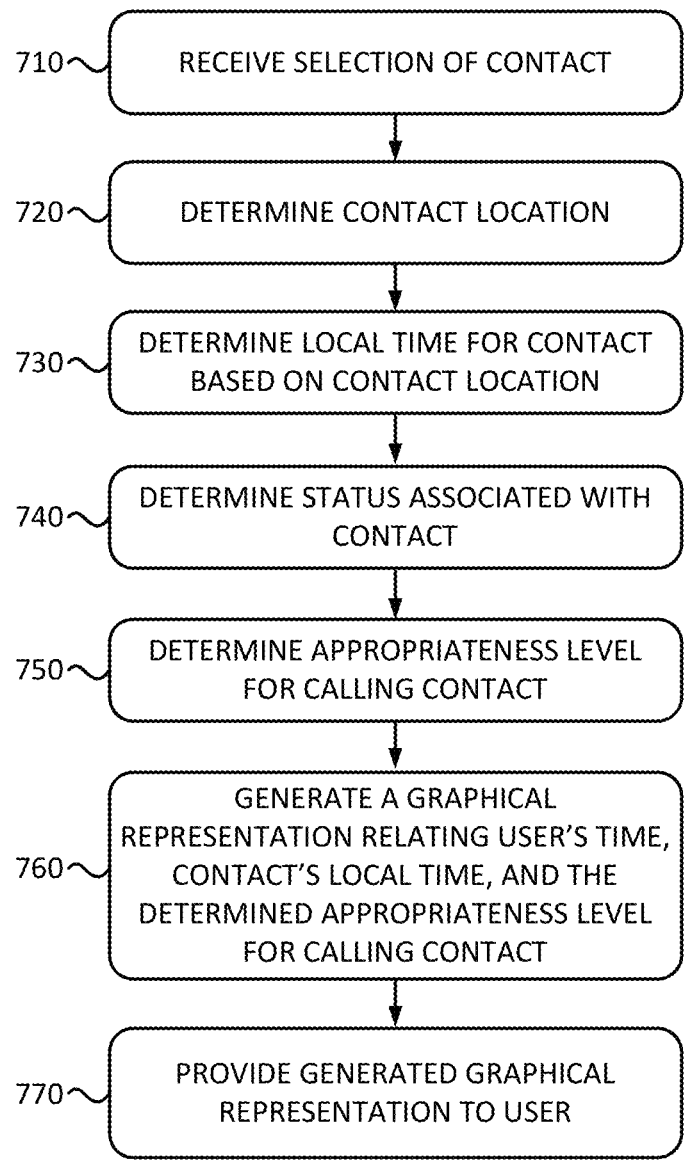
FIG. 7 is a flow chart of an exemplary process for generating a graphical representation of call appropriateness according to an implementation described herein.

FIG. 7 is a flow chart of an exemplary process for generating call appropriateness information according to an implementation described herein. In one implementation, the process of FIG. 7 may be performed by user device 110. In other implementations, some or all of the process of FIG. 7 may be performed by another device or a group of devices separate from user device 110 and/or including user device 110. For example, in another implementation, some or all of the process of FIG. 7 may be performed by user information server 130.

The process of FIG. 7 may include receiving a selection of a contact (block 710). For example, the user may select a contact from a list of contacts stored in contacts memory 420. In one example, the user may select to call the contact. In another example, the user may select to determine whether it is appropriate to call the contact.

A contact location may be determined (block 720). For example, the location of the contact may be obtained by accessing contacts memory 420. Additionally or alternatively, the location of the contact may be requested by user device 110 from user information server 130. User information server 130 may retrieve the location of the contact from user information memory 520. If user information memory 520 does not include information about the location of the contact, or if the information about the location of the contact in user information memory 520 is determined to be outdated, user information server 130 may determine an updated location of the contact. For example, user information server 130 may send a request for location information to user device 110, associated with the contact, or to a network node that maintains information about the location of the user device 110, associated with the contact.

A local time for the contact may be determined based on the contact location (block 730). For example, call appropriateness monitor 430 may determine a time zone associated with the contact, based on the location of the contact. Call appropriateness monitor 430 may then determine a current time and may determine the local time by adding or subtracting a number of hours corresponding to a difference, in the number of hours, between the time zone of the user and the time zone of the selected contact. Alternatively, call appropriateness monitor 430 may access a look up table to identify the contact's local time.

A status associated with the contact may be determined (block 740). For example, call appropriateness monitor 430 may determine a status associated with the selected contact. In one example, the status may be determined by accessing user status field 660 associated with the selected contact. In another example, the status may be determined by accessing an account associated with the selected contact based on information stored in associated user accounts field 650 of the selected contact. For example, call appropriateness monitor 430 may access a web document associated with the Facebook account of the selected contact and determine whether any updates have been posted within a particular period of time. If a recent update has been posted, call appropriateness monitor 430 may analyze the update to determine whether any relevant status information has been included in the update. For example, call appropriateness monitor 430 may determine whether text included in the update includes a term or a phrase on a list of terms and/or phrases included in status table 686.

An appropriateness level for calling the contact may be determined (block 750). For example, call appropriateness monitor 430 may access appropriateness level memory 435 and identify an appropriateness level from a particular table. For example, if call appropriateness monitor 430 does not identify a particular table in country tables 682 or call type tables 684, or does not identify a particular status in status table 686, call appropriateness monitor 430 may select an appropriateness level from default table 680 based on the local time associated with the selected contact. In other scenarios, call appropriateness monitor 430 may select an appropriateness level from another table. For example, call appropriateness monitor 430 may identify a particular country associated with the selected user and may determine that a particular table exists for the particular country in country tables 682. As another example, call appropriateness monitor 430 may determine a call type associated with the received request and may identify a particular table associated with the call type in call type tables 684. As yet another example, a particular table may identify an entry in status table 686 based on a determined status associated with the user.

A graphical representation relating the user's time, the contact's local time, and the determined appropriateness level may be generated (block 760). For example, graphical representation generator 450 may generate a time zone wheel that relates the user's time to the contact's time, aligned concentrically on a clock. The appropriateness level of calling the contact may be represented by a particular color, shading, pattern, graphical indicator, or text, of the part of the clock that displays the contact's time. A user may be able to select a particular type of indication. For example, a colorblind user may select to represent the appropriateness levels by particular patterns rather than colors. As another example, a visually impaired user may select an audible indication of the appropriateness level to be played to the user.

Furthermore, the time zone wheel may include other information associated with the contact, such as, for example, local weather, local news, and/or local events associated with the contact. The local weather, news, and/or events information may be obtained, for example, from a server device associated with a weather service, a news service, or a community announcements service.

As another example, an appropriateness level for calling a contact may be displayed in connection with information associated with the contact, such as a contact listing. For example, if the received request corresponds to a request to view a list of contacts stored on user device 110, the appropriateness level associated with a particular contact may be represented as a color and/or shading of a background associated with the particular contact listing. Furthermore, the contact listing may include other information associated with the contact, such as, for example, local weather associated with the contact, information identifying a country associated with the contact's location, a status associated with the contact, etc.

As yet another example, graphical representation generator 450 may generate a map that includes the selected contact displayed on a map of the world. The map may include information identifying a contact, a local time associated with the contact, an appropriateness level associated with the contact, and/or a status associated with the contact. As yet another example, an appropriateness level for calling a contact may be displayed in connection with a screen that informs the user that an outgoing call is being placed to the contact or with a screen that informs the user of an incoming call from the contact.

The generated graphical representation may be provided to the user (block 770). For example, user device 110 may display the generated graphical representation via user interface 230.

Figure 8:
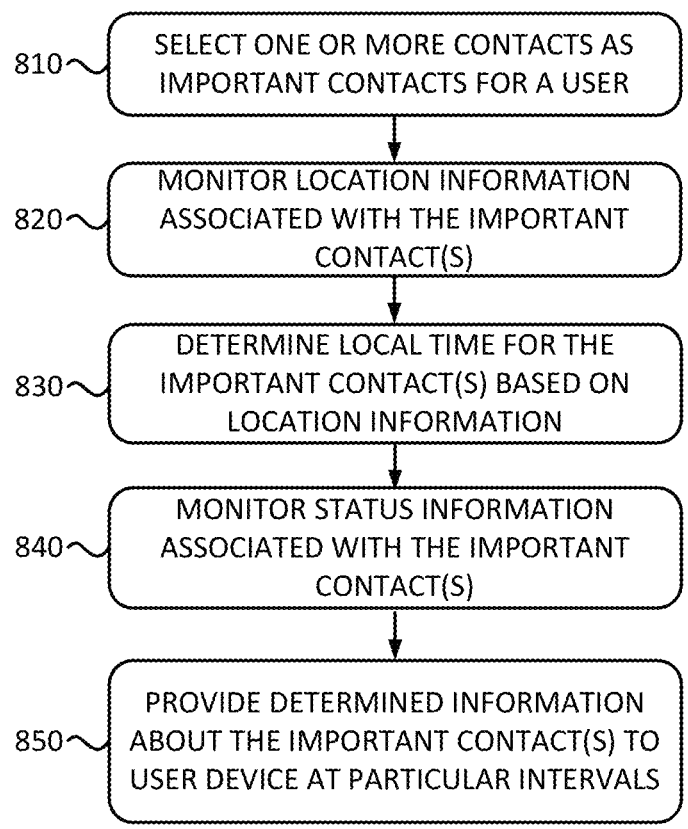
FIG. 8 is a flow chart of an exemplary process for providing information about important contacts to a user according to an implementation described herein.

FIG. 8 is a flow chart of an exemplary process for providing information about important contacts to a user according to an implementation described herein. In one implementation, the process of FIG. 8 may be performed by user information server 130. In other implementations, some or all of the process of FIG. 8 may be performed by another device or a group of devices separate from user information server 130 and/or including user information server 130.

The process of FIG. 8 may include selecting one or more contacts as important contacts with respect to a user (block 810). For example, update unit 410 of user device 110 may, with the user's permission, provide a list of important contacts associated with user device 110 to user information server 130. A contact may be determined to be important, for example, if the user calls the contact at least a particular number of times within a particular time period, if the user received at least a particular number of calls from a contact within a particular time period, or if the user designates the contact as an important contact. The set of important contacts associated with the user may be stored in connection with the user in user information memory 520.

Location information associated with important contacts may be monitored (block 820). For example, user information manager 510 may receive an update about locations of user devices 110 at particular intervals from user devices 110 or from one or more network nodes that maintain information about locations of user devices 110. As another example, user information manager 510 may request location information from user device 110 or from a network node that maintains information about the location of user device 110.

A local time for the important contacts may be determined based on the location information (block 830). For example, user information manager 510 may determine a time zone associated with the contact, based on the location of the contact. User information manager 510 may then determine a current time and may determine the local time by, for example, adding or subtracting a number of hours corresponding to a difference, in the number of hours, between the time zone of the user and the time zone of the selected contact, or by accessing a look up table that stores local time information for various time zones.

Status associated with the important contacts may be monitored (block 840). For example, user information manager 510 may determine a status associated with the selected contact. The status may be determined by accessing an account associated with the selected contact based on information stored in associated user accounts field 650 of the selected contact. For example, user information manager 510 may access a web document associated with the Facebook account of the selected contact and determine whether any updates have been posted within a particular period of time.

The determined information may be provided to a user device at particular intervals (block 850). For example, update publisher 530 may provide the determined information (e.g., location information, local time information, and/or status information) for important contacts, associated with a user, to user device 110, associated with the user. User device 110 may use the received information to update contacts memory 420.

Figure 9:
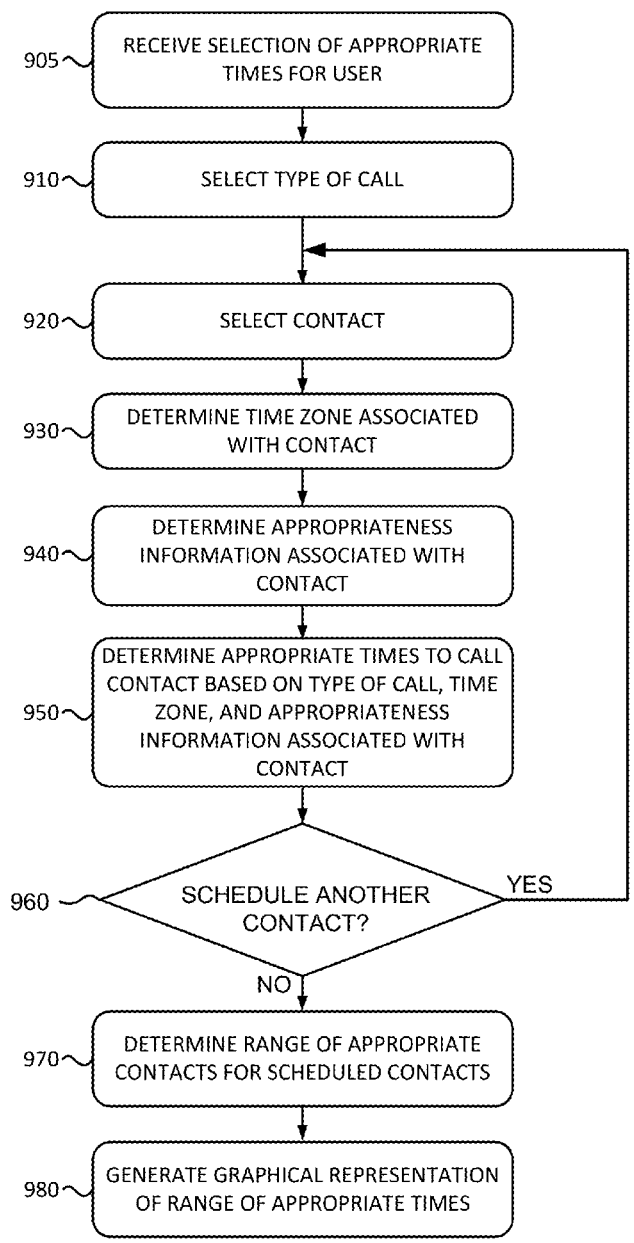
FIG. 9 is a flow chart of an exemplary process for generating a graphical representation of a range of appropriate times according to an implementation described herein.

FIG. 9 is a flow chart of an exemplary process for generating a graphical representation of a range of appropriate times according to an implementation described herein. In one implementation, the process of FIG. 9 may be performed by user device 110. In other implementations, some or all of the process of FIG. 9 may be performed by another device or a group of devices separate from user device 110 and/or including user device 110.

The process of FIG. 9 may include receiving a selection of appropriate times for the user (block 905). A user may activate scheduling unit 440 when selecting to schedule a call and may select a range of times that are appropriate for the user. For example, the user may select that the call is to be scheduled between 9 AM and 5 PM of the user's local time.

A selection of a type of call may be received (block 910). For example, the user may select a type of call as a business call, a personal call, or as another type of call. A selection of a contact may be received (block 920). For example, the user may select a contact, from contact memory 420, with which to schedule a call. A time zone associated with the selected contact may be determined (block 930). For example, scheduling unit 440 may determine a location associated with the selected contact by accessing contacts memory 420 and may determine a time zone associated with the determined location.

Appropriateness information associated with the contact may be determined (block 940). For example, scheduling unit 440 may access contacts memory 420 to determine whether any appropriateness information for the contact may be determined, such as, for example, time preferences specified by the contact. Appropriate times to call the selected contact may be determined based on the type of call, the time zone, and the appropriateness information associated with the selected contact (block 950). For example, scheduling unit 440 may activate call appropriateness monitor 430 to determine a range of appropriate times for the selected contact and for the type of call. Call appropriateness monitor 430 may identify a particular table stored in appropriateness level memory 435 and may determine a range of times associated with a particular appropriateness level (e.g., "appropriate").

A determination may be made as to whether to schedule another contact (block 960). For example, scheduling unit 440 may determine whether the user selects to add another contact to the scheduled call or whether the user indicates no additional contacts will be selected (e.g., by selecting to schedule the selected one or more contacts). If it is determined that another contact is to be scheduled (block 960—YES), processing may return to block 920.

If it is determined that no other contact is to be selected (block 960—NO), a range of appropriate times for the scheduled contacts may be determined (block 970). For example, scheduling unit 440 may convert the determined ranges of appropriate times associated with each selected contact into corresponding time ranges in the user's time zone and may match the converted times to the selected range of times appropriate for the user. For example, assume the user, located in the eastern standard time zone, selected a time range of 6:30 AM to 3 PM, selected a first contact in Germany with an appropriate time range of 9 AM to 5 PM German time, and selected a second contact in Korea with an appropriate time range of 1 PM to 8:30 PM Korean time. Converting the German time range and the Korean time range to the eastern standard time range may generate a time range of 6:30 AM to 7:30 AM as an appropriate time range to schedule a call between the user, the first contact, and the second contact. If a range of times may not be determined for all the selected contacts, scheduling unit 440 may determine a range of time for as many of the selected contacts as possible.

A graphical representation of the determined range of appropriate times may be generated and provided to the user (block 980). For example, graphical representation generator 450 may generate a time zone wheel that relates the user's selected range of times to the range of appropriate times associated with each of the selected contacts. Furthermore, graphical representation generator 450 may include the determined range of appropriate times for the selected contacts that is within the user's selected range of times.

Figure 10:
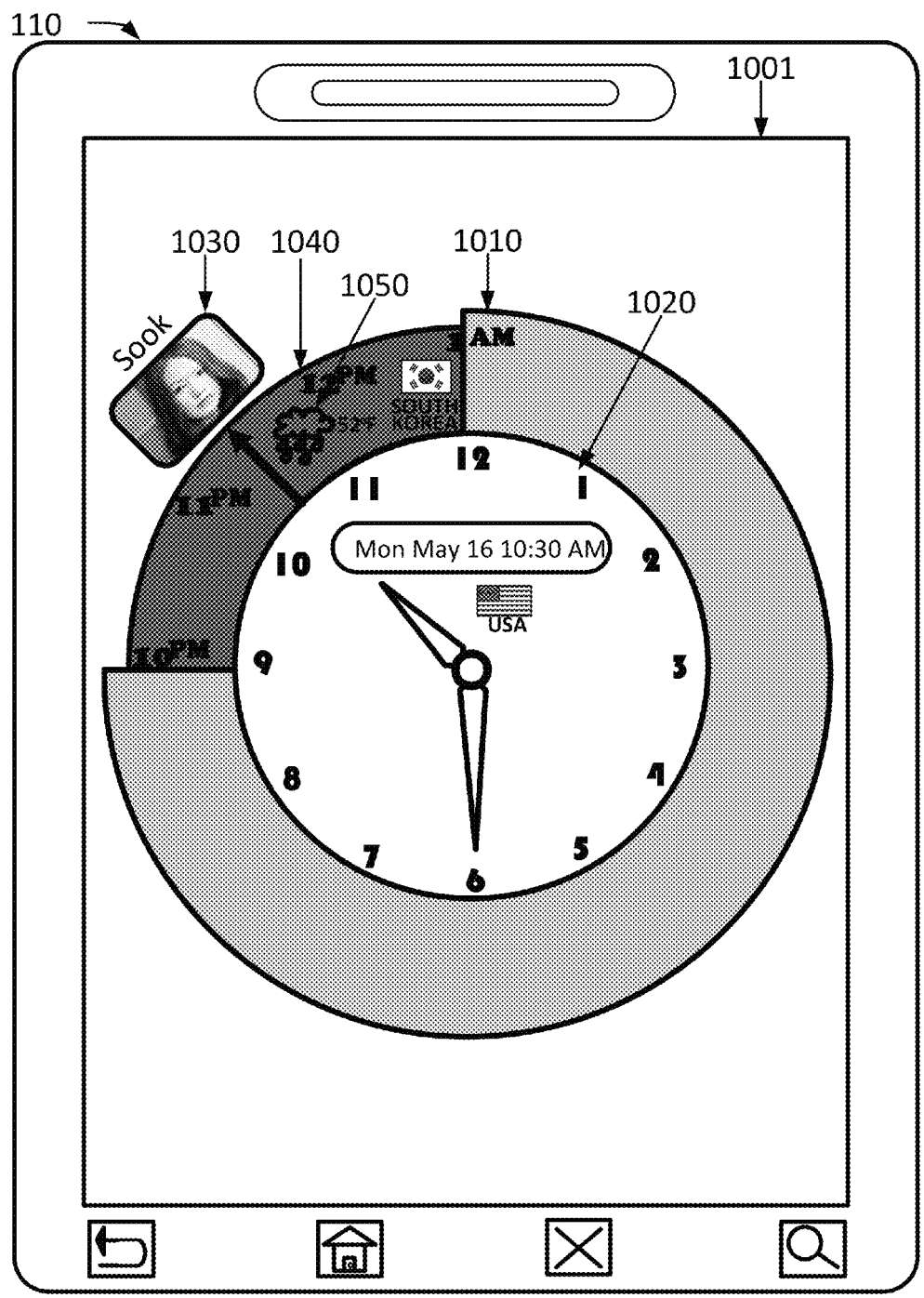
FIG. 10 is a diagram of a first exemplary user interface according to an implementation described herein.

FIG. 10 is a diagram of a first exemplary user interface 1001 according to an implementation described herein. As shown in FIG. 10, user interface 1001 may include a time zone wheel 1010. In one implementation, time zone wheel 1010 may appear on user interface 230 of user device 110 in response to a user selecting to call a contact. In another implementation, time zone wheel 1010 may appear on user interface 230 of user device 110 in response to a user requesting to check whether it is an appropriate time to call a particular contact. Time zone wheel 1010 may include a clock 1020. Clock 1020 may display a time local to user device 110.

Furthermore, time zone wheel 1010 may include a contact identifier 1030 that identifies a particular contact and a contact clock 1040 associated with the particular contact. Contact identifier 1030 may include, for example, a name and a picture associated with the contact. Contact clock 1040 may display a local time associated with the particular contact in relation to the time local to user device 110. Thus, time zone wheel 1010 may provide a visual representation of the user's time with respect to the local time associated with the selected contact.

Moreover, contact clock 1040 may display an indication of the appropriateness of calling the particular contact at the current time. In one implementation, the indication of appropriateness may be provided through a color and/or shading of contact clock 1040. For example, in FIG. 10, the local time, corresponding to the eastern time zone of United States, is displayed as 10:30 AM. The particular contact in FIG. 10 is located in Korea, which is 13 hours ahead. Thus, the local time in Korea is 11:30 PM. Since this may be too late to call, the appropriateness level of calling may be low. Therefore, contact clock 1040 may be displayed with a dark shading, indicative of the fact that it is currently night in Korea and corresponding to a low appropriateness level. Additionally, contact clock 1040 may include additional information, such as, for example, a weather indicator 1050. Weather indicator 1050 may provide information about local weather associated with the contact. Contact clock 1040 may include other information associated with the contact's location, such as information about a local event.

In another implementation, the appropriateness may be indicated using a different type of visual (and/or audio indicator). For example, time zone wheel 1010 may include a textual message explaining whether or not it is currently appropriate to call the contact and may also include an explanation for the level of appropriateness.

Figure 11:
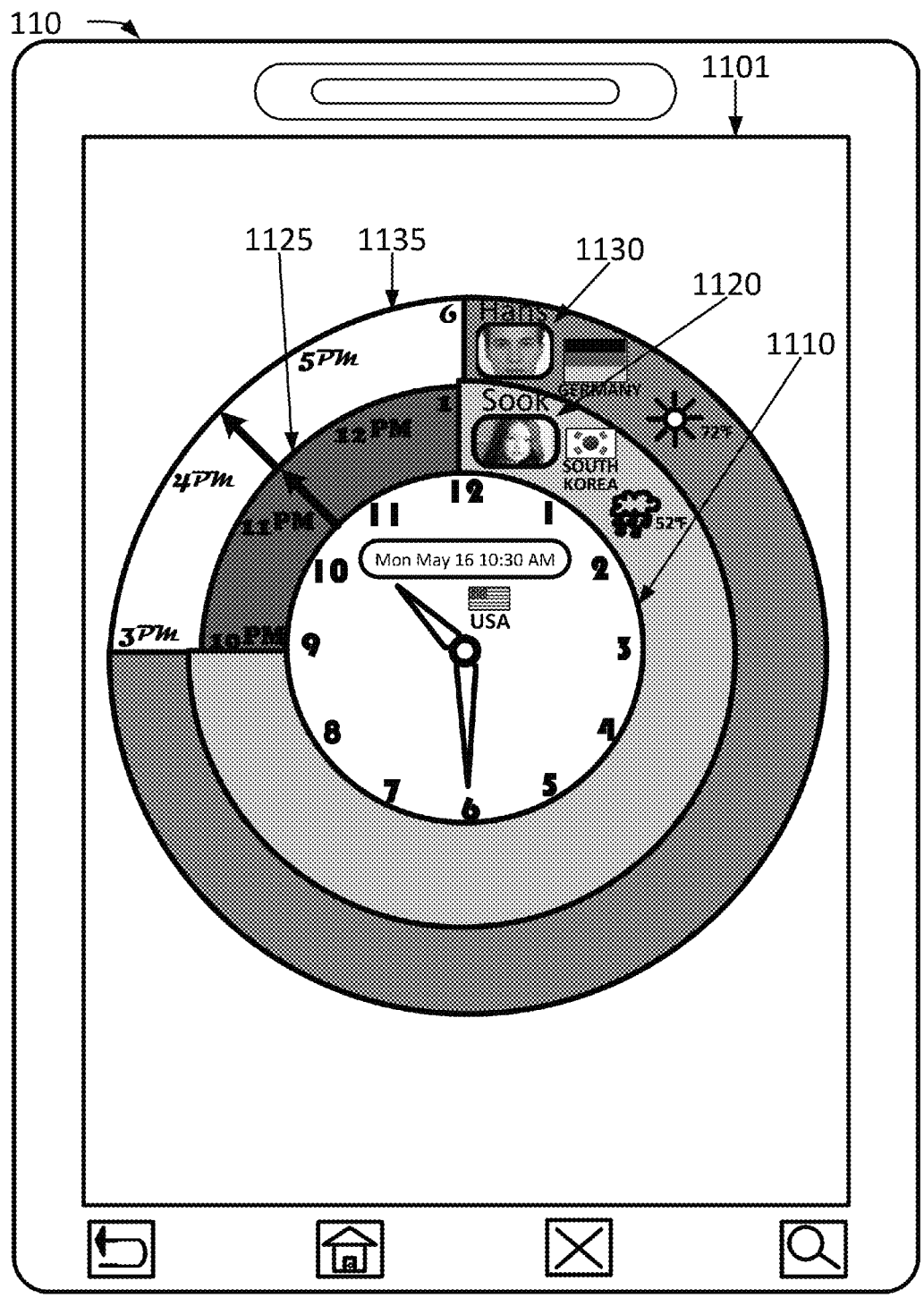
FIG. 11 is a diagram of a second exemplary user interface according to an implementation described herein.

FIG. 11 is a diagram of a second exemplary user interface 1101 according to an implementation described herein. As shown in FIG. 11, user interface 1101 may include a time zone wheel 1105 that includes information about multiple contacts. Time zone wheel 1105 may include a clock 1110, a first contact identifier 1120, a first contact clock 1125, a second contact identifier 1130, and a second contact clock 1135. Clock 1110 may display a time local to user device 110; first contact identifier 1120 may identify a first contact and first contact clock 1125 may display a local time associated with the first contact and aligned with the time local to user device 110; second contact identifier 1130 may identify a second contact and second contact clock 1135 may display a local time associated with the second contact and aligned with the time local to user device 110.

Figure 12:
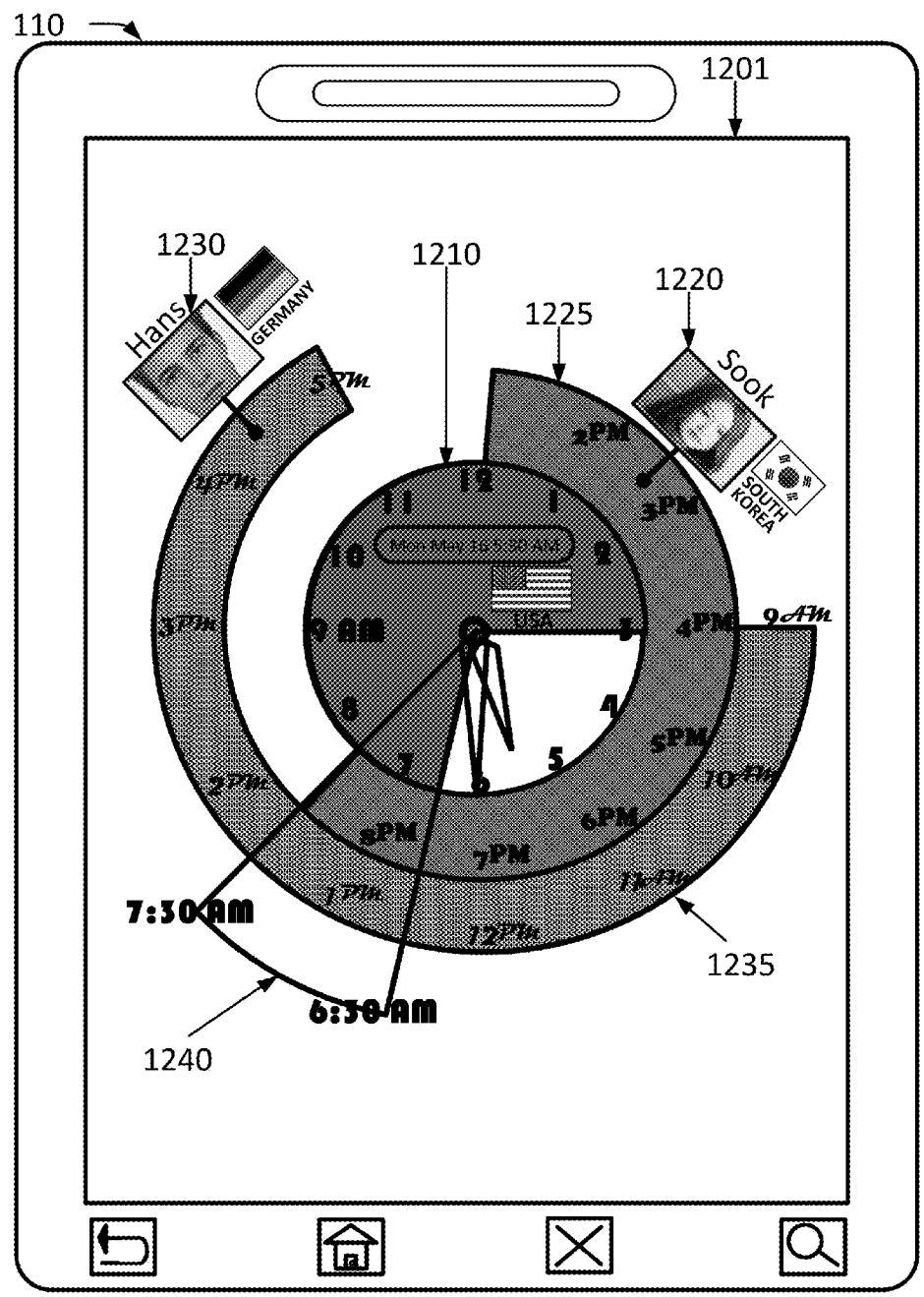
FIG. 12 is a diagram of a third exemplary user interface according to an implementation described herein.

FIG. 12 is a diagram of a third exemplary user interface 1201 according to an implementation described herein. User interface 1201 may be generated in response to a request to schedule a telephone call with two contacts. As shown in FIG. 12, user interface 1201 may include a clock 1210, a first contact identifier 1220, a first contact time range 1225, a second contact identifier 1230, a second contact time range 1235, and a matching time range 1240.

Clock 1210 may display a time range selected by the user. For example, clock 1210 indicates that the user has selected a time range of 6:30 AM to 3 PM eastern standard time. First contact identifier 1220 may identify a first contact selected by the user and first contact time range 1225 may identify a range of appropriate times associated with the first contact. For example, first contact identifier 1220 may identify the first contact as being located in Korea and first contact time range 1225 may identify the range of times as 1 PM to 8:30 PM Korean time, which may correspond to a range of 12 AM to 7:30 AM eastern time.

Second contact identifier 1230 may identify a second contact selected by the user and second contact time range 1235 may identify a range of appropriate times associated with the second contact. For example, second contact identifier 1230 may identify the second contact as being located in Germany and second contact time range 1235 may identify the range of times as 9 AM to 5 PM German time, which may correspond to a range of 3 PM to 11 PM eastern time.

Matching time range 1240 may indicate a range of times that matches the time range selected by the user with first contact time range 1225 and with second contact time range 1235. For example, matching time range 1240 may indicate a time range of 6:30 AM to 7:30 AM as the time range that matches the time range selected by the user with first contact time range 1225 and with second contact time range 1235.

Figure 13:
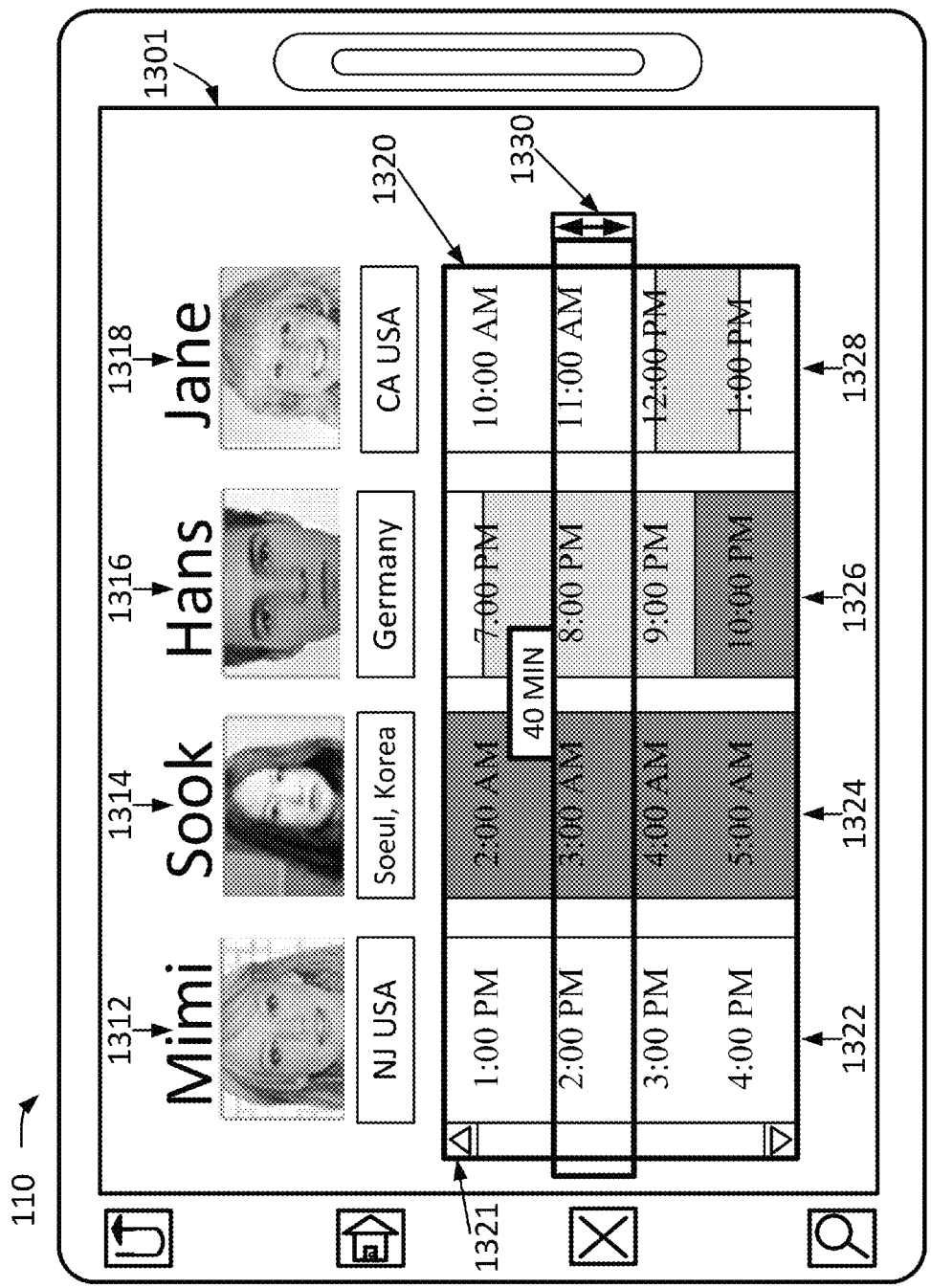
FIG. 13 is a diagram of a fourth exemplary user interface according to an implementation described herein.

Another implementation of a graphical representation to schedule a telephone call between one or more contacts may include a multislider that relates local times associated with one or more contacts to the user's local time. FIG. 13 is a diagram of a fourth exemplary user interface 1301 according to an implementation described herein. As shown in FIG. 13, user interface 1301 may include a user indicator 1312, a first contact indicator 1314, a second contact indicator 1316, and a third contact indicator 1318. Furthermore, user interface 1301 may include a multislider 1320 and a scheduling window 1330.

Multislider 1320 may include a user slider 1322, associated with the user; a first contact slider 1324, associated with the first contact indicator 1314; a second contact slider 1326, associated with the second contact indicator 1326; and a third contact slider 1328, associated with the third contact indicator 1318. User indicator 1312 may identify the user and user slider 1322 may display time local to the user. First contact indicator 1314 may identify a first selected contact and first contact slider 1324 may display time local to the first contact and align the time local to the first contact with a corresponding time local to the user. Similarly, second contact indicator 1316 may identify a second selected contact and second contact slider 1326 may display time local to the second contact and align the time local to the second contact with a corresponding time local to the user; and third contact indicator 1318 may identify a third selected contact and third contact slider 1328 may display time local to the third contact and align the time local to the third contact with a corresponding time local to the user.

Furthermore, first contact slider 1324, second contact slider 1326, and third contact slider 1328 may include indications of appropriateness levels for calling through a particular color and/or shading. For example, first contact slider 1324 includes a dark shading for the displayed times of 2 AM to 5 AM, indicating an inappropriate time to call the first contact; second contact slider 1326 includes a light shading between the times of 7:30 PM to 9:30 PM, indicating a somewhat inappropriate time to call, and a dark shading after 9:30 PM, indicating an inappropriate time to call; and third contact slider 1328 may include a light shading between the times of 12 PM and 1 PM, indicating a somewhat inappropriate time to call, and no shading for the displayed times of 9:30 AM to 12 PM and after 1 PM, indicating appropriate times to call.

Multislider 1320 may include a scrollbar 1321. Scrollbar 1321 may allow the user to slide user slider 1322 up or down to change a displayed range of times for the user. Multislider 1320 may slide first contact slider 1324, second contact slider 1326, and third contact slider 1328 along with user slider 1322 to display local times of the first, second, and third contact that correspond to the displayed user times. Scheduling window 1330 may be used to select a particular time range for scheduling a call between the user and the first, second, and third contacts.

Figure 14:
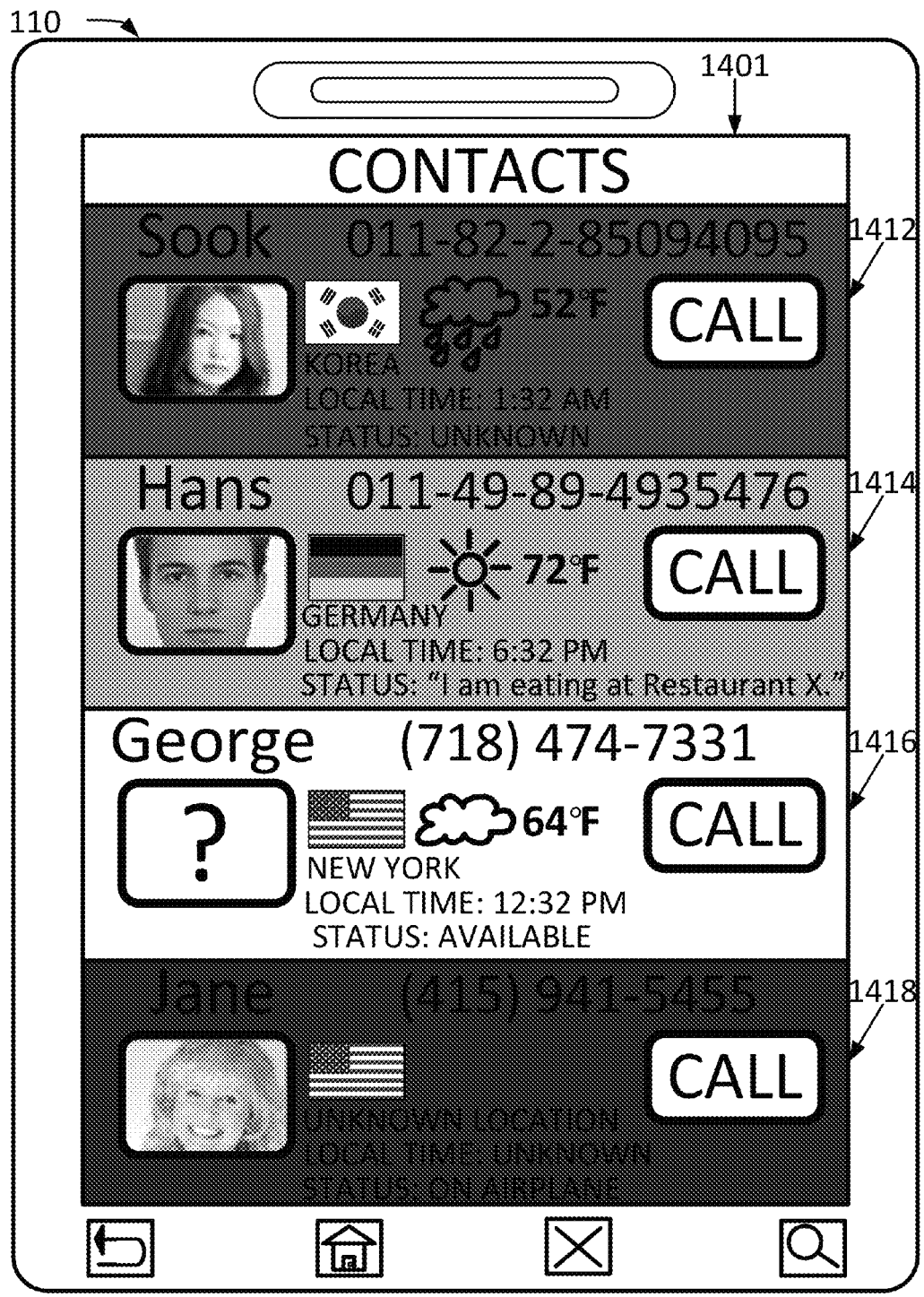
FIG. 14 is a diagram of a fifth exemplary user interface according to an implementation described herein.

FIG. 14 is a diagram of a fifth exemplary user interface 1401 according to an implementation described herein. User interface 1401 may include indications of an appropriateness level in connection with a contact listing. As shown in FIG. 14, user interface 1401 may include a first contact listing 1412, a second contact listing 1414, a third contact listing 1416, and a fourth contact listing 1418.

First contact listing 1412 may include information about a first contact, such as the first contact's name, a picture of the first contact, the first contact's phone number, a flag of the country associated with the first contact, and a call button to initiate a call to the first contact. Furthermore, first contact listing 1412 may display a local time for the first contact, a local weather icon or symbol for the first contact, and a status associated with the first contact. Moreover, the background of first contact listing 1412 may be of a particular color and/or shading to indicate a current appropriateness level for calling the contact. For example, as the local time for the first contact is 1:32 AM, the background may include a dark shading to indicate nighttime and to indicate a low appropriateness level for calling the first contact.

Second contact listing 1414 may include a status obtained from a post on a social media website account associated with the second contact that states "I am eating at Restaurant X." Even though the local time 6:32 PM for the second contact may indicate an appropriate time to call the second contact, the background of second contact listing 1414 may be lightly shaded to indicate a somewhat inappropriate time to currently call the second contact, based on the status associated with the contact. For example, call appropriateness monitor 430 may detect the term "eating" in the obtained status update and may identify a particular appropriateness level in status table 686 based on the detected term.

Third contact listing 1416 may include an "available" status associated with the third contact. Furthermore, the local time of the third contact may be associated with a high appropriateness level and, therefore, the background of third contact listing 1416 may not be shaded to indicate a current high appropriateness level to call the third contact.

Fourth contact listing 1418 may include an "on airplane" status. For example, user device 110 associated with the fourth contact may have been placed into an airplane mode. Therefore, based on the status associated with the fourth contact, the background of fourth contact listing 1418 may include a dark shading to indicate that the fourth contact is unavailable and currently associated with a low appropriateness level.

Figure 15:
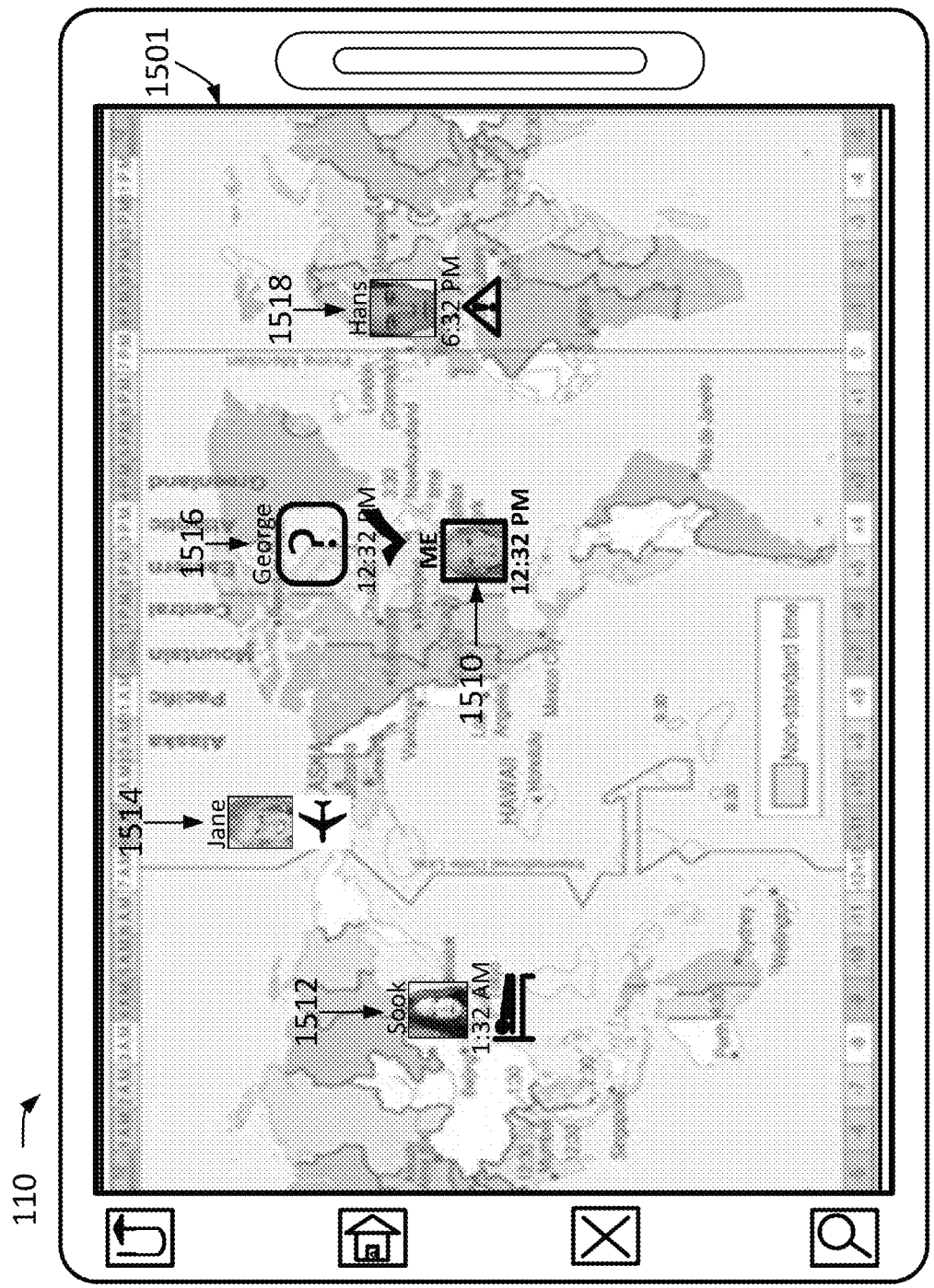
FIG. 15 is a diagram of a sixth exemplary user interface according to an implementation described herein.

FIG. 15 is a diagram of a sixth exemplary user interface 1501 according to an implementation described herein. User interface 1501 may include a time zone map that displays one or more contacts. In one implementation, when the user selects to display a time zone map, user interface 1501 may be configured to display a particular number of important contacts. In another implementation, the user may select to display one or more contacts, from a listing of contacts, on user interface 1501.

As shown in FIG. 15, user interface 1501 may include a user indicator 1510, a first contact indicator 1512, a second contact indicator 1514, a third contact indicator 1516, and a fourth contact indicator 1518. User indicator 1510 may display a location of the user on the map and may display a local time associated with the user. First contact indicator 1512 may display a location of the first contact on the map, a local time associated with the first contact, and a status associated with the first contact. Since the local time of the first contact is 1:32 AM, a bed icon may be included in first contact indicator 1512 to inform the user that the first contact is probably sleeping.

Second contact indicator 1514 may not include a local time, as the local time associated with the second contact may not be known. Rather, second contact indicator 1514 may include an airplane symbol to indicate that the second contact is currently on an airplane. Third contact indicator 1516 may display a location of the third contact on the map, a local time associated with the third contact, and a status associated with the third contact. Since the third contact may be associated with a high appropriateness level, third contact indicator 1516 may include a checkmark symbol to indicate a current high appropriateness level to call the third contact.

Fourth contact indicator 1518 may display a location of the fourth contact on the map, a local time associated with the fourth contact, and a status associated with the fourth contact. Since the fourth contact may be associated with a medium appropriateness level, fourth contact indicator 1518 may include an exclamation symbol to indicate a current medium appropriateness level to call the fourth contact.

Figure 16A:
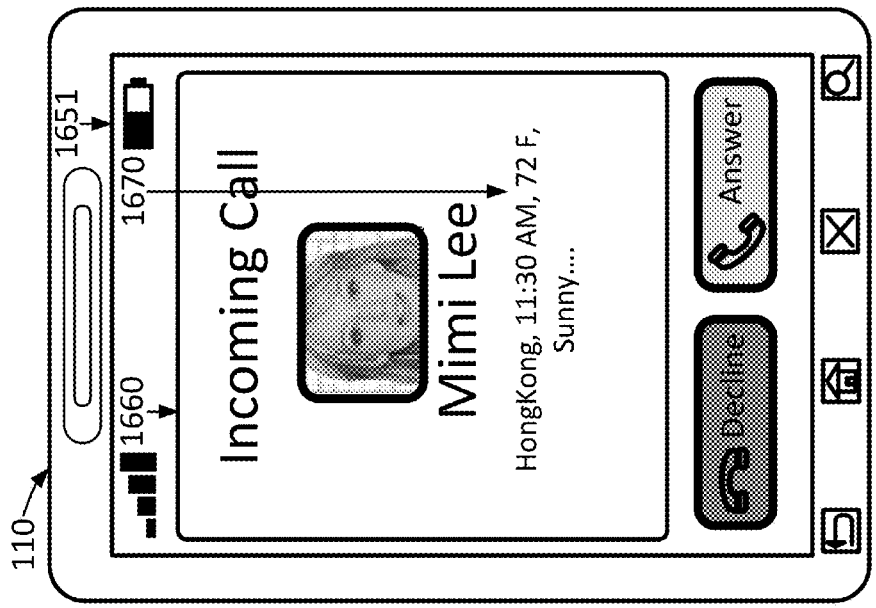
FIGS. 16A and 16B are diagrams of a seventh exemplary user interface according to an implementation described herein.
Figure 16B:
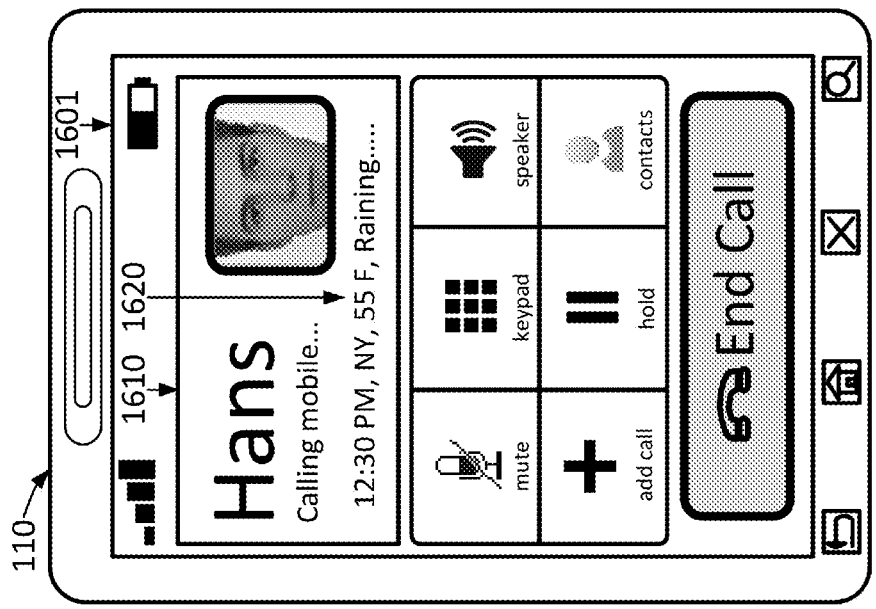

FIGS. 16A and 16B are diagrams of a seventh example of exemplary user interfaces according to an implementation described herein. FIG. 16A illustrates user interface 1601 of a user device 110, corresponding to a mobile device, that informs a user that an outgoing call is being placed to a contact. User interface 1601 may include a contact information window 1610 that includes a contact's name, the contact's picture, and an indication that a call is being placed to the contact. Furthermore, user interface 1601 may include a local information indicator 1620 that includes local information associated with the contact. For example, local information indicator 1620 may display a local time associated with the contact, a location associated with the contact, and local weather associated with the contact.

FIG. 16B illustrates user interface 1651 of user device 110, corresponding to a mobile device, which informs a user of an incoming call from a contact. User interface 1651 may include a contact information window 1660 that includes a contact's name, the contact's picture, and an indication that a call is being received from the contact. Furthermore, user interface 1651 may include a local information indicator 1670 that includes local information associated with the contact. For example, local information indicator 1670 may display a local time associated with the contact, a location associated with the contact, and local weather associated with the contact.

Figure 17:
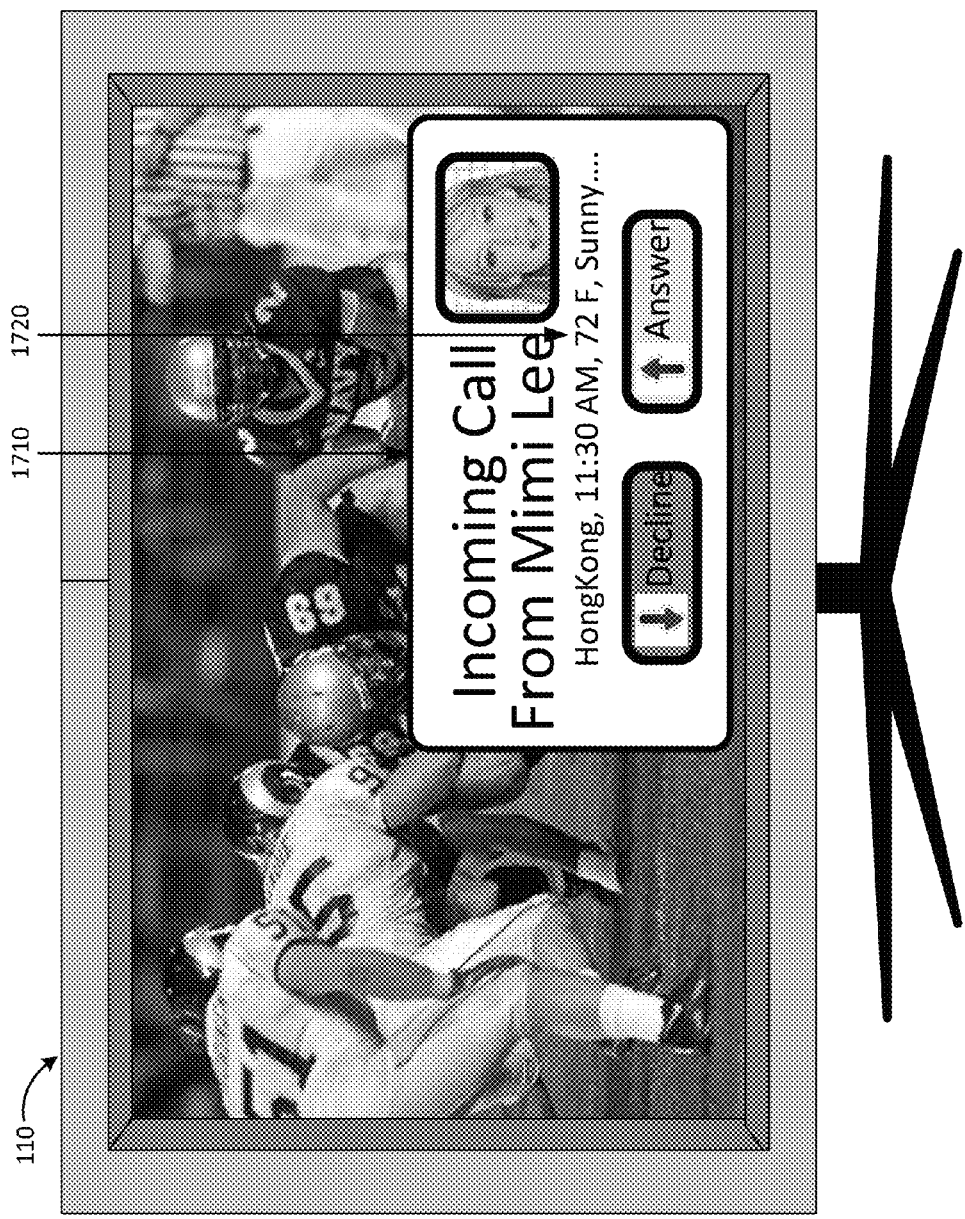
FIG. 17 is a diagram of an eighth exemplary user interface according to an implementation described herein.

FIG. 17 is a diagram of an eighth exemplary user interface 1701 according to an implementation described herein. FIG. 17 illustrates an example wherein user device 110 corresponds to a television with telephone service. For example, the user may receive VoIP telephone service over a same connection through which the user receives television service (e.g., via a set top box). The user may receive a telephone call from a contact while watching a television program. An incoming call indicator 1710 may appear on the television. Incoming call indicator 1710 may include information about the contact, such as, for example, includes a contact's name, the contact's picture, and an indication that a call is being received from the contact. Furthermore, incoming call indicator 1710 may include a local information indicator 1720 that includes local information associated with the contact. For example, local information indicator 1720 may display a local time associated with the contact, a location associated with the contact, and local weather associated with the contact.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while particular devices and processes have been described with respect to telephone calls, in another implementation, the devices and processes may be implemented with respect to sending text messages.

As another example, a screen that informs a user about an incoming and/or outgoing call to or from a contact may display information about the contact, such as, for example, a local time associated with the contact, an appropriateness level associated with the contact, weather information associated with the contact, local event information associated with the contact, and/or any other information associated with the contact.

As yet another example, while series of blocks have been described with respect to FIGS. 7-9, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a mobile communication device, the method comprising:
  selecting, at the mobile communication device, a set of contacts from a plurality of contacts associated with a user of the mobile communication device, determined to be of more importance to the user than other contacts of the plurality of contacts;
  sending, by the mobile communication device via a network, a listing of the set of contacts to a network device;
  receiving, at the mobile communication device at periodic intervals, published updates corresponding to the set of contacts from the network device via the network;
  receiving, by the mobile communication device, a selection of a contact of the set of contacts;
  determining, by the mobile communication device, a location associated with the contact using a published update corresponding to the contact;
  determining, by the mobile communication device, a local time associated with the contact based on the determined location;
  determining, by the mobile communication device, an appropriateness level for communicating with the contact from multiple appropriateness levels, based on the determined local time;

receiving, by the mobile communication device, a request to schedule a call with the contact;

obtaining, by the mobile communication device, a first range of times for the call appropriate for the user;

determining, by the mobile communication device, a second range of times for the call appropriate for the contact;

converting the second range of times to a same time zone as the first range of times;

determining, by the mobile communication device, a time overlap of the first range of times and the second range of times based on the converted second range of times; and generating, by the mobile communication device, a graphical representation that displays the first range of times, the converted second range of times, and the time overlap and relates a local time associated with the mobile communication device, the local time associated with the contact, and an indication of the determined appropriateness level for calling the contact.

2. The method of claim 1, wherein the graphical representation includes a time zone wheel that includes:

a local clock that displays the local time associated with the mobile communication device;

a contact clock that displays the local time associated with the contact, wherein the local time associated with the mobile communication device is concentrically aligned with the local time associated with the contact; and the indication of the determined appropriateness level associated with the contact clock, wherein the indication includes a particular color, or shading corresponding to the appropriateness level.

3. The method of claim 1, further comprising:

receiving a request to call another contact;

determining a location associated with the other contact;

determining a local time associated with the other contact based on the determined location associated with the other contact;

determining, by the mobile communication device, an appropriateness level for calling the other contact, based on the determined local time associated with the other contact; and adding, to the generated graphical representation, the local time associated with the other contact, and an indication of the determined appropriateness level for calling the other contact.

4. The method of claim 1, further comprising:

determining, based on the published update corresponding to the contact, a status associated with the contact; and wherein the determining an appropriateness level for calling the contact is further based on the determined status.

5. The method of claim 4, wherein the status is based on at least one of:

a status mode associated with a mobile device and selected by the contact; or a status associated with a social media website account associated with the contact.

6. The method of claim 1, wherein the determining an appropriateness level for calling the contact includes:

accessing a table that relates particular times to particular appropriateness levels, wherein non-contiguous ranges of times are selectable to be associated with a same appropriateness level.

7. The method of claim 1, wherein the determining an appropriateness level for calling the contact includes:

retrieving, based on the published update corresponding to the contact, information associated with the contact, wherein the retrieved information includes a range of times specified by the contact as an appropriate range of times to call the contact; and determining the appropriateness level based on the retrieved information.

8. The method of claim 1, wherein the published updates include one or more of:

the location associated with the contact, the local time associated with the contact, or an appropriateness preference, selected by the contact, wherein the appropriateness level for calling the contact is determined based on the appropriateness preference.

9. The method of claim 1, further comprising:

obtaining information about at least one of weather, local news, or local events associated with the location associated with the contact; and providing at least some of the obtained information in the graphical representation.

10. The method of claim 1, wherein the listing of the set of contacts include a contact listing associated with the contact, and wherein the contact listing includes an indication of the determined appropriateness level.

11. The method of claim 1, further comprising:

generating a map; and plotting a representation of the contact on the map at a location of the map corresponding to the location associated with the contact, wherein the representation of the contact includes information about the local time associated with the contact, and wherein the representation of the contact includes an indication of the determined appropriateness level.

12. A mobile communication device comprising:

a memory to store instructions; and a processor configured to execute the instructions to:

select a set of contacts from a plurality of contacts associated with a user of the mobile communication device, determined to be of more importance to the user than other contacts of the plurality of contacts;

send, via a network, a listing of the set of contacts to a network device;

receive, at periodic intervals, published updates corresponding to the set of contacts from the network device via the network;

receive a selection of a contact of the set of contacts after receiving the published update corresponding to the contact;

determine a location associated with the contact using the published update corresponding to the contact;

determine a local time associated with the contact based on the determined location;

determine an appropriateness level for communicating with the contact from multiple appropriateness levels, based on the determined local time;

receive a request to schedule a call with the contact;

obtain a first range of times for the call appropriate for the user;

determine a second range of times for the call appropriate for the contact;

convert the second range of times to a same time zone as the first range of times;

determine a time overlap of the first range of times and the second range of times based on the converted second range of times; and generate a graphical representation that displays the first range of times, the converted second range of times, and the time overlap and relates a local time associated with the mobile communication device, the local time associated with the contact, and an indication of the determined appropriateness level for calling the contact.

13. The mobile communication device of claim 12, wherein the graphical representation includes:
   a local clock that displays the local time associated with the mobile communication device;
   a contact clock that displays the local time associated with the contact, wherein the local time associated with the mobile communication device is concentrically aligned with the local time associated with the contact; and
   the indication of the determined appropriateness level associated with the contact clock, wherein the indication includes a particular color, or shading corresponding to the appropriateness level.

14. The mobile communication device of claim 12, wherein the processor is further configured to execute the instructions to:
   determine, based on the published update corresponding to the contact, a status associated with the contact; and
   wherein the processor is further configured to execute the instructions to determine the appropriateness level for calling the contact based on the determined status.

15. The mobile communication device of claim 14, wherein the status is based on at least one of:
   a status mode associated with a mobile device and selected by the contact; or
   a status associated with a social media website account associated with the contact.

16. The mobile communication device of claim 12, wherein, when determining the appropriateness level for calling the contact, the processor is further configured to execute the instructions to:
   retrieve, based on the published update corresponding to the contact, information associated with the contact, wherein the retrieved information includes a range of times specified by the contact as an appropriate range of times to call the contact; and
   determine the appropriateness level based on the retrieved information.

17. A non-transitory computer-readable medium storing instructions executable by one or more processors, the non-transitory computer-readable medium comprising:
   one or more instructions to select a set of contacts, from a plurality of contacts associated with a user of the mobile communication device, determined to be of more importance to the user than other contacts of the plurality of contacts;
   one or more instructions to send, via a network, a listing of the set of contacts to a network device;
   one or more instructions to receive, at periodic intervals, published updates corresponding to the set of contacts from the network device via the network;
   one or more instructions to receive a selection of a contact of the set of contacts after receiving the published update corresponding to the contact;
   one or more instructions to determine a location associated with the contact using the published update corresponding to the contact;
   one or more instructions to determine a local time associated with the contact based on the determined location;
   one or more instructions to determine an appropriateness level for communicating with the contact from multiple appropriateness levels, based on the determined local time;
   one or more instructions to receive a request to schedule a call with the contact;
   one or more instructions to obtain a first range of times for the call appropriate for the user;
   one or more instructions to determine a second range of times for the call appropriate for the contact;
   convert the second range of times to a same time zone as the first range of times:
   one or more instructions to determine a time overlap of the first range of times and the second range of times based on the converted second range of times; and
   one or more instructions to generate a graphical representation that displays the first range of times, the converted second range of times, and the time overlap and relates a local time associated with the mobile communication device, the local time associated with the contact, and an indication of the determined appropriateness level for calling the contact.

18. The non-transitory computer-readable medium of claim 17, wherein the graphical representation includes:
   a local clock that displays the local time associated with the mobile communication device;
   a contact clock that displays the local time associated with the contact, wherein the local time associated with the mobile communication device is concentrically aligned with the local time associated with the contact; and
   the indication of the determined appropriateness level associated with the contact clock, wherein the indication includes a particular color, or shading corresponding to the appropriateness level.

19. The non-transitory computer-readable medium of claim 17, wherein the one or more instructions to determine an appropriateness level for calling the contact includes:
   one or more instructions to retrieve, based on the published update corresponding to the contact, information associated with the contact, wherein the retrieved information includes a range of times specified by the contact as an appropriate range of times to call the contact; and
   one or more instructions to determine the appropriateness level based on the retrieved information.

* * * * *